(12) United States Patent
Schenk et al.

(10) Patent No.: US 8,471,188 B2
(45) Date of Patent: Jun. 25, 2013

(54) SENSOR DEVICE WITH TILTING OR ORIENTATION-CORRECTING PHOTO SENSOR FOR ATMOSPHERE CREATION

(75) Inventors: Tim Corneel Wilhelmus Schenk, Eindhoven (NL); Paulus Henricus Antonius Damink, Eindhoven (NL); Lorenzo Feri, Eindhoven (NL)

(73) Assignee: Koninlijke Philips Electronics N.V., Eindhoven (NL)

( * ) Notice: Subject to any disclaimer, the term of this patent is extended or adjusted under 35 U.S.C. 154(b) by 360 days.

(21) Appl. No.: 12/863,204

(22) PCT Filed: Jan. 19, 2009

(86) PCT No.: PCT/IB2009/050176
§ 371 (c)(1),
(2), (4) Date: Jul. 16, 2010

(87) PCT Pub. No.: WO2009/093162
PCT Pub. Date: Jul. 30, 2009

(65) Prior Publication Data
US 2011/0266415 A1    Nov. 3, 2011

(51) Int. Cl.
*H01J 40/14* (2006.01)

(52) U.S. Cl.
USPC ..................................... 250/205; 315/149

(58) Field of Classification Search
USPC ............... 250/205, 201.1, 221, 216; 315/149, 315/151, 291, 294, 312; 340/815.42, 815.45, 340/815.65, 815.73
See application file for complete search history.

(56) References Cited

U.S. PATENT DOCUMENTS
| | | | |
|---|---|---|---|
| 5,198,877 A | 3/1993 | Schulz | |
| 5,764,291 A | 6/1998 | Fullam | |
| 6,128,086 A | 10/2000 | Fowler et al. | |
| 6,333,605 B1 | 12/2001 | Grouev et al. | |
| 7,965,050 B2 * | 6/2011 | Nieuwlands | 315/312 |
| 8,093,817 B2 * | 1/2012 | Frumau et al. | 315/151 |

FOREIGN PATENT DOCUMENTS
| | | |
|---|---|---|
| JP | 04192568 A | 7/1992 |
| WO | 0213490 A2 | 2/2002 |
| WO | 2004057927 A1 | 7/2004 |
| WO | 2006111934 A1 | 10/2006 |

* cited by examiner

*Primary Examiner* — Kevin Pyo
(74) *Attorney, Agent, or Firm* — Mark L. Beloborodov

(57) ABSTRACT

The present invention relates to a method and a device for controlling a physical property of light emitted from a light source. In particular, the invention can be applied to a lighting system for atmosphere creation. The measurements needed for feedback control are made at a portable user device comprising a planar photodetector. More or less all industrially available photodetectors are of the planar type, but planarity is in fact a necessary feature to achieve faithful relative measurements. Since the user device is portable, variations in the orientation of the photodetector can introduce large and unpredictable measurement errors, making effective control of the light source impossible. According to one embodiment of the invention, the orientation-dependent errors are eliminated by measuring the actual orientation of the photodetector and processing the detection signal appropriately. According to a second embodiment, the photodetector is movably mounted in the user device in order to retain its preferred orientation irrespective of the orientation of the user device. In a third embodiment, the emitted light is monitored by a plurality of photodetectors; knowing the actual orientation of the user device, the control device can give priority to the measurements coming from the best oriented photodetector at every instant.

17 Claims, 2 Drawing Sheets

SENSOR DEVICE WITH TILTING OR ORIENTATION-CORRECTING PHOTO SENSOR FOR ATMOSPHERE CREATION

FIELD OF THE INVENTION

The present invention relates to a method and a device for controlling a physical property of light emitted from a light source. In particular, the invention can be applied to a lighting system for atmosphere creation.

BACKGROUND OF THE INVENTION

The introduction of multiple colour-variable and dimmable lighting devices, in professional retail environments as well as the home environment, has opened possibilities of interactive lighting atmosphere creation. Moreover, it has become essential to enable intuitive user interaction with the lighting system since this often comprise a considerable number of light sources on the ceiling or the walls. To this end, one may utilise lighting devices which comprise both a main light source and a modulated light source, the latter of which can embed identification data in its emitted light. Since high-power light sources which allow modulation are becoming increasingly available, embodiments where the main light source embeds the identification data are often preferred to lighting devices with two separate light sources.

An invention which entails embedding of identification data into light for lighting purposes is described in WO 2006/111934. The identification data, embedded in the light, enable both identification of individual light sources and estimation of their corresponding contributions to the actual colour and intensity of the emitted light seen from different locations. Status data can be transmitted in addition to identifiers. According to the disclosed invention, the contributions from the different light sources are measured with a combined sensor and user-input device. The measured value is subsequently input to a master controller, which generates driving signals provided to the light sources.

In many applications, particularly when the lighting device operates in a retail environment, it is problematical to install permanent light sensors. This is why portable user-input devices, which are primarily an interface by which to specify the desired light output, often are given the additional functionality of measuring the actual light output. The user-input device then constitutes the sole source of feedback to the control device, which provides driving signals to the light sources. One realises that under these circumstances, measurements are made at comparatively long time intervals or altogether irregularly, whenever the user notices that the performance of the lighting device has deteriorated, in other words, that the light atmosphere created by the device has altered visibly. One further realises that the quality of the measurements is all the more critical as they are scarce. An important source of error is misalignment of the user device.

Commercially available light sensors comprise filtered or unfiltered photodetectors, and the vast majority of these are planar, that is, their light-sensitive portion is a flat surface. The normal direction of this surface defines a preferred direction for incident light rays, and consequently planar photodetectors are intrinsically directional, in contrast to radio antennas and other receivers outside the visible range. Likewise, most illuminated objects have a preferred viewing direction—vertical for floors, horizontal for walls and normal for general sloping surfaces—which has to be respected when a corresponding lighting device is designed and arranged in its environment. It is equally important during operation of the lighting device that the light sensor providing information for feedback control is correctly aligned. Regrettably, oblique measurements made by untrained users can be very inaccurate, making rational control of the light sources impossible.

In atmosphere creation, a further problem arises in addition to the mentioned defective reliability of absolute measurements on a single light source. In this technology, there is a frequent need for measurements of relative contributions, for instance, the contribution from each light source (which can be individually identified thanks to the modulation) which is visible from a given point on the illuminated surface. Since obliquely impinging light rays contribute to the brightness of a non-glossy surface by a relatively smaller amount than normal rays, the sought measurement is fundamentally directional, and the issue of correctly aligning the light sensor cannot be ignored. In the particular case of light sources arranged on the ceiling, a planar photodetector would be correctly aligned when it is parallel to the ceiling. Replacing a directional light sensor by an isotropic one in this situation is not a way around the step of aligning the sensor, as this would not reproduce the composite light pattern reaching the point on the surface.

SUMMARY OF THE INVENTION

It is an object of the present invention to provide an improved method for controlling a modulated light source—with respect to the colour, intensity or some other property of the emitted light—and to provide means for implementation of this method. It is a particular object of the present invention to provide a control method and a control device for light sources used in atmosphere creation, satisfying this technology's demand for faithful relative measurements.

This and other objects are achieved by performing the measurements at a portable user device comprising a photodetector which is planar but nevertheless provides a correct value of the physical property to be controlled, at least after the appropriate processing of the detection signal. Here, the "correct" value is that which would have been reported by a similar light sensor positioned in a preferred orientation, depending on the characteristics of the illuminated environment.

Thus, in accordance with one aspect of the present invention, there is provided a method for controlling a property of light emitted by at least one light source, said method comprising the steps of receiving modulated light emitted by said at least one light source, which modulation permits discrimination from further light incident on the photodetector, at a planar photodetector movably arranged at a portable user device in order to retain a preferred orientation;

generating a detection signal representing a value of said physical property of the received light; and transmitting driving signals to said at least one light source on the basis of the detection signal.

For performing feedback control of the value of the physical property of the light, this property is monitored by means of a light sensor which is always within a predefined range of the correct alignment. Because of the orientation-preserving mounting of the photodetector, the above method is indeed insensitive to deviations from the preferred orientation of the user device.

The mounting may consist of a composite joint, such as a gimbal arrangement, or some other connection having the same functionality. To achieve orientation adaptation one can use simple mechanical constructions. The use of active feedback control is also envisaged, either for generating driving signals to an electrical actuator, such as a linear motor, or for providing signals to the user of how to adjust the tilting of the device in order to position it in the preferred orientation.

In accordance with a second aspect of the present invention, there is provided a method for controlling a property of light emitted by at least one light source, said method comprising the steps of receiving, at a planar photodetector, modulated light emitted by said at least one light source, which modulation permits discrimination from further light incident on the photodetector;

generating a detection signal representing a value of said physical property of the received light;

determining an actual orientation of the photodetector with respect to a preferred orientation;

determining, from the detection signal and the determined actual orientation, a corrected value of said physical property of the received light; and transmitting driving signals to said at least one light source based on the corrected value.

According to this embodiment, the light is received by a photodetector which is rigidly connected to the user device. This way the orientation of the photodetector differs by a constant angle from that of the user device, that is, entirely unpredictably. However, the method includes sensing an actual orientation of the photodetector and compensating for a possible deviation from the preferred direction by processing the detection signal. In principle, the corrected value can be robustly deduced from the detection signal as soon as the user device is so positioned that it receives a non-zero portion of the light from the light source which is to be controlled.

In a particular embodiment, the corrected value is read from a look-up table based on a combination of the value measured by the light sensor and its orientation. In some applications it may indeed turn out advantageous not to compute the corrected value but instead interpolate between stored values which have been computed in advance with high accuracy.

In yet another embodiment, the measurements are performed by a plurality of photodetectors, arranged in order to receive light from a plurality of directions. Processing of the detection signals could then consist in giving priority to the information provided by that photodetector which is closest to the preferred orientation.

In accordance with a third and fourth aspect of the invention, there is provided a respective apparatus which implements each of the methods described above. In one embodiment, there is provided an apparatus wherein the photodetector is maintained in the preferred orientation by being mounted on a gyro. In a particular embodiment of the apparatus, the photodetector is connected to the user device via a mechanical joint so constructed that the energy-minimal configuration coincides with the preferred orientation of the photodetector. In yet another embodiment of the invention, the orientation sensor, which provides the actual orientation of the photodetector to the control unit, comprises a microelectromechanical system (MEMS).

BRIEF DESCRIPTION OF THE FIGURES

The invention will now be described in more detail and with reference to the appended drawings.

DETAILED DESCRIPTION OF PREFERRED EMBODIMENTS

Figure 1:
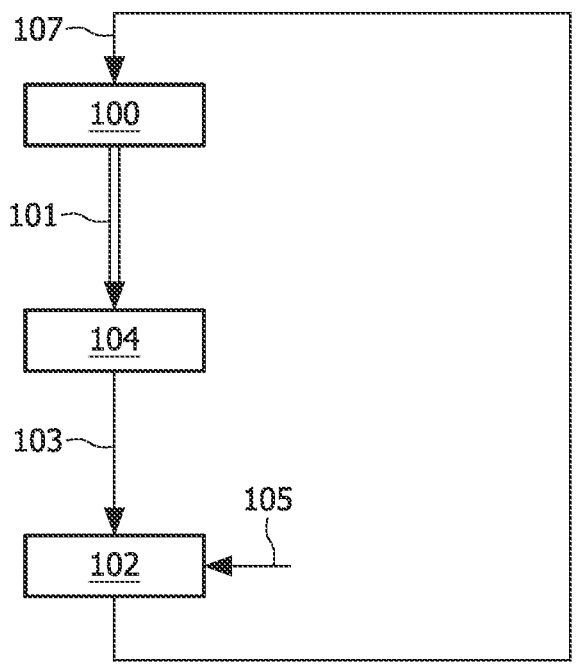
FIG. 1 is a block diagram showing a lighting system according to an embodiment of the invention.

By way of examples, embodiments of the present invention will now be described with reference to FIG. 1. An apparatus for controlling a physical property of light 101 emitted by at least one light source 100 comprises a control unit 102, which generates driving signals 107 to said at least one light source on the basis of a target value 105 and an actual value 103 of said property. The control apparatus comprises a portable user device, which includes a light sensor and which may include an interface for specifying the target value 105 of said physical property of the light. Other portions of the control apparatus may be implemented in the user device or elsewhere.

In a first embodiment, the apparatus further comprises a photodetector 104, which is movably mounted in the user device. Hence, regardless of the position (within a certain operative range) of the user device, the photodetector can be maintained in a preferred orientation, i.e., typically horizontally, so as to enable correct measurements of the light. Depending on the importance attributed to performance, weight, cost etc. for a particular product, the orientation can be maintained by different passive or active means. According to a first passive orientation-control method, which exploits the gravitational field, the photodetector is mounted by means of a joint so designed that the energy-minimal configuration coincides with the preferred orientation of the photodetector. According to another passive orientation-control method, based on conservation of angular momentum, the photodetector is rigidly connected to a gyro.

The orientation of the photodetector can also be maintained by means of active feedback control. On the one hand, the force needed to restore the photodetector into the preferred orientation can be applied by an electrical motor. On the other hand, the user device can transmit luminous or acoustic signals which guide the user in tilting the device correctly. In either case, the user device is equipped with an orientation sensor.

Figure 2:
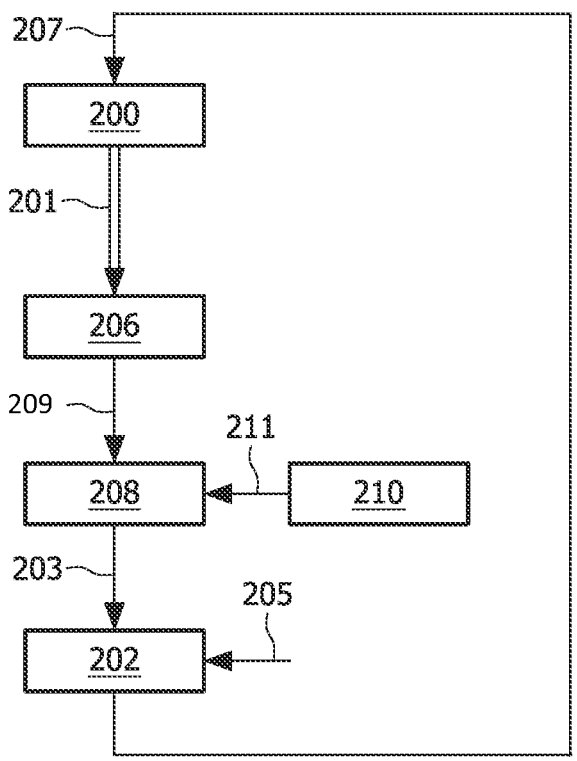
FIG. 2 is a block diagram showing a lighting system, which comprises an orientation sensor, according to a second embodiment of the invention.

Furthermore, there is provided a second embodiment, see FIG. 2, which proposes an alternative solution to the technical problems discussed in the background section. The apparatus then comprises, in addition to the components mentioned in the first paragraph [namely, light source 200, light 201, actual value 203, control unit 202, target value 205, and driving signal 207], a rigidly mounted photodetector 206, the actual orientation 211 of which is monitored by an orientation sensor 210 and reported to a correcting means 208, which determines a corrected value 203 of the physical property to be controlled on the basis of the detection signal which represents a measured, "local" value 209. Put differently, the obtained detection signal is interpreted with regard to the orientation in which it is received.

The actual orientation of the photodetector can be reported by some suitable kind of gyroscope, such as a microelectromechanical gyroscope (MEMS gyroscope), or by an inertial positioning system.

The correcting means processes the detection signal according to the nature of the physical property to be controlled. As an example, suppose the physical property to be measured and controlled is the intensity and the preferred direction is vertical. If the normal direction of the light-sensitive surface of the photodetector is situated at a polar angle φ, then the intensity $I_D$ reported by the photodetector and the intensity I reported by an identical but vertically positioned photodetector are related by $$I = \frac{I_D}{\cos\phi}.$$

In the example, this operation is the appropriate processing to be performed before the reported intensity is fed into the control loop. For φ values not too close to a right angle, multiplying by 1/cos φ restores that intensity which would have been measured by a vertically oriented photodetector.

It is sometimes expedient to interpolate between pre-computed correction factors, notably when they are given by complicated mathematical expressions. In the above example, this would mean storing values of 1/cos φ for particular φ values, spaced according to the required accuracy.

Figure 3:
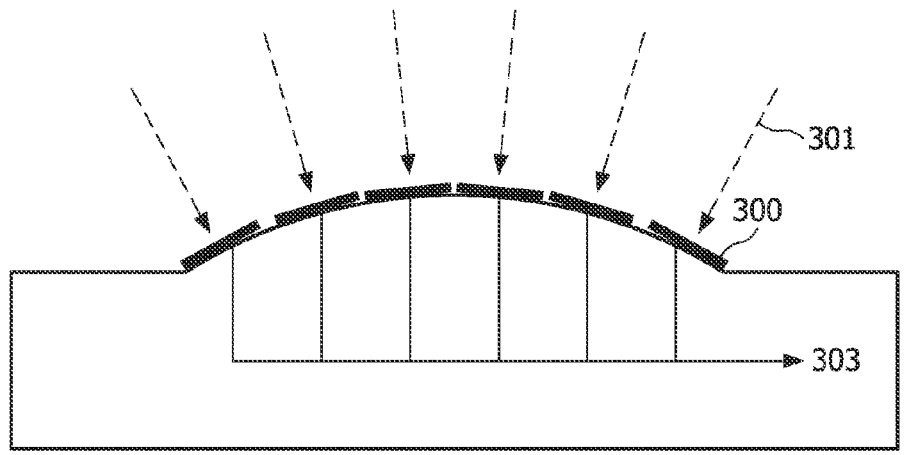
FIG. 3 shows a photodetector arrangement which is part of a lighting system according to a third embodiment of the invention.
Figure 4:
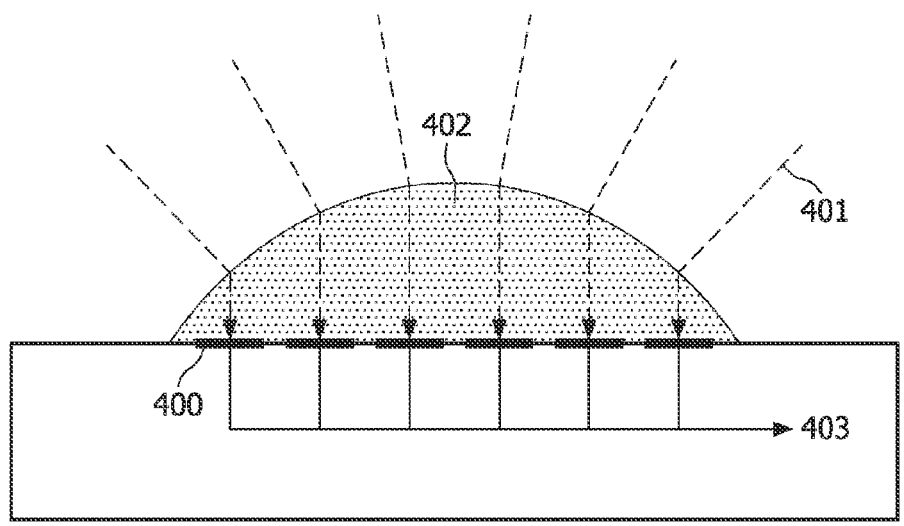
FIG. 4 shows a photodetector arrangement comprising an optical lens which photodetector arrangement is part of a lighting system according to a fourth embodiment of the invention.

There is also provided a third embodiment, which is shown in FIGS. 3 and 4, according to which the apparatus comprises more than one rigidly mounted photodetector. The detection signal 303, 403 is then a composite signal. By measuring the actual orientation of the user device, from which the actual orientation of each photodetector follows, the processing means can determine which photodetector is best suited to receive the light at a given instant. The correction means then gives priority to the measurements made by that photodetector which receives light in the most suitable orientation, that is, the orientation closest to the preferred one. This photodetector becomes either the main or the only source of information for determining an actual value of the property of the light to be controlled. To diversify the set of available reception orientations, the photodetectors may be arranged on a curved surface, see FIG. 3. The same result can also be achieved if a lens 402 is arranged at the photodetectors, see FIG. 4. Multiple-detector embodiments generally give a better quality of the measurements, especially at low light intensities, since they are performed by a close-to-optimally situated photodetector each time.

The means denoted 102, 202, 208 are typically implemented by means of a processing unit, such as a computer, executing appropriate software code for realising the described functionality of correcting and controlling. A central computer may be utilised for receiving the detection signals, performing the described processing, generating the required driving signals and transmitting the driving signals to the light sources. Hence, the control portion according to a preferred embodiment of the present invention may be implemented with a portable user device and a computer executing appropriate software code.

The invention claimed is:

1. A method for controlling a physical property of light emitted by at least one light source, said method comprising the steps of
receiving modulated light emitted by said at least one light source, which modulation permits discrimination from further light incident on the photodetector, at a planar photodetector movably arranged at a portable user device in order to retain a preferred orientation;
generating a detection signal representing a value of said physical property of the received light; and
transmitting driving signals to said at least one light source on the basis of the detection signal.

2. A method according to claim 1, which further comprises the step of mechanically tilting the photodetector to decrease a deviation of the photodetector from said preferred orientation.

3. A method for controlling a physical property of light emitted by at least one light source, said method comprising the steps of
signalling to a user to change the orientation of a planar photodetector, which is arranged at a portable user device, in order to decrease a deviation of the photodetector from a preferred orientation;
receiving modulated light emitted by said at least one light source, which modulation permits discrimination from further light incident on the photodetector, at the photodetector;
generating a detection signal representing a value of said physical property of the received light; and
transmitting driving signals to said at least one light source on the basis of the detection signal.

4. A method for controlling a physical property of light emitted by at least one light source, said method comprising the steps of
receiving modulated light emitted by said at least one light source, which modulation permits discrimination from further light incident on the photodetector, at a planar photodetector arranged at a portable user device;
generating a detection signal representing a value of said physical property of the received light;
determining an actual orientation of the photodetector with respect to a preferred orientation;
determining, from the detection signal and the determined actual orientation, a corrected value of said physical property of the received light; and
transmitting driving signals to said at least one light source based on the corrected value.

5. A method according to claim 4, further comprising the steps of
receiving modulated light emitted by at least one light source, which modulation permits discrimination from further light incident on each photodetector, at at least two planar photodetectors arranged at a portable user device; and
generating a detection signal composed of the measurements by all photodetectors and representing a value of said physical property of the received light,
wherein the corrected value of said physical property of the received light is based on the measurement at that photodetector which receives light in an orientation closest to the preferred orientation.

6. A method according to claim 5, wherein the light is received in a plurality of different orientations.

7. A method according to claim 4, wherein the corrected value is determined by multiplying the detection signal with a number associated with the actual orientation of the photodetector.

8. A method according to claim 4, wherein the corrected value is derived from a look-up table.

9. A method according to claim 4, wherein the corrected value is determined by a formula.

10. An apparatus for controlling a physical property of light emitted by at least one light source, said apparatus comprising
a planar photodetector movably arranged at a portable user device in order to retain a preferred orientation, said photodetector being arranged to receive modulated light emitted by said at least one light source, which modulation permits discrimination from further light incident on the photodetector, from which photodetector a detection signal representing a value of said physical property of the received light is generated; and means for transmitting driving signals to said at least one light source (100) on the basis of the detection signal.

11. An apparatus according to claim 10, wherein the photodetector is arranged at the user device by means of a gimbal arrangement.

12. An apparatus according to claim 10, wherein the photodetector is arranged at the user device by means of a gyro.

13. An apparatus for controlling a physical property of light emitted by at least one light source, said apparatus comprising a planar photodetector mounted in a portable user device, said photodetector being arranged to receive modulated light emitted by said at least one light source, which modulation permits discrimination from further light incident on the photodetector, from which photodetector a detection signal representing a value of said physical property of the received light is generated;

means for determining the actual orientation of the photodetector with respect to a preferred orientation;

means for determining, from the detection signal and the actual orientation, a corrected value of said physical property of the light; and means for transmitting driving signals to said at least one light source on the basis of the corrected value.

14. An apparatus according to claim 13, comprising at least two planar photodetectors mounted in a portable user device, said photodetectors being arranged to receive modulated light emitted by said at least one light source, which modulation permits discrimination from further light incident on the photodetector, from which photodetectors a detection signal composed of the measurements by all photodetectors and representing a value of said physical property of the received light is generated, wherein the corrected value of said physical property of the received light is based on the measurement at that photodetector which receives light in an orientation closest to the preferred orientation.

15. An apparatus according to claim 14, wherein said at least two planar photodetectors are arranged to receive light in a plurality of different orientations.

16. An apparatus according to claim 14, wherein an optical lens is arranged at said at least two planar photodetectors.

17. An apparatus according to claim 13, wherein the means for sensing the orientation of the photodetector comprises a microelectromechanical system (MEMS).

\* \* \* \* \*